United States Patent [19]

Yamamoto et al.

[11] Patent Number: 4,462,085
[45] Date of Patent: Jul. 24, 1984

[54] WORD PROCESSOR FOR CONTROLLING AN EXTERNAL DICTATING MACHINE

[75] Inventors: Senji Yamamoto, Yokohama; Kihee Yamamoto, Sagamihara, both of Japan

[73] Assignee: Sony Corporation, Tokyo, Japan

[21] Appl. No.: 328,854

[22] Filed: Dec. 9, 1981

[30] Foreign Application Priority Data

Dec. 16, 1980 [JP] Japan .......................... 55-180513[U]

[51] Int. Cl.³ .............................................. G06F 1/00
[52] U.S. Cl. ...................................... 364/900; 369/29
[58] Field of Search ... 364/200 MS File, 900 MS File; 369/20, 24–27, 29; 360/69, 74.1

[56] References Cited

U.S. PATENT DOCUMENTS

| | | | |
|---|---|---|---|
| 3,512,137 | 5/1970 | Jones et al. | 369/25 |
| 3,648,249 | 3/1972 | Goldsberry | 369/29 |
| 4,110,823 | 8/1978 | Cronshaw et al. | 364/200 |
| 4,120,583 | 10/1978 | Hyatt | 364/474 |
| 4,237,497 | 12/1980 | Trevithick | 360/74.1 |
| 4,272,813 | 6/1981 | Howell et al. | 364/900 |
| 4,301,525 | 11/1981 | Mohammadioun | 369/29 |
| 4,319,337 | 3/1982 | Sander et al. | 369/29 |
| 4,330,776 | 5/1982 | Dennison, Jr. et al. | 340/365 R |

FOREIGN PATENT DOCUMENTS 2077023 12/1981 United Kingdom ................ 369/27

*Primary Examiner*—Raulfe B. Zache
*Attorney, Agent, or Firm*—Lewis H. Eslinger; Alvin Sinderbrand

[57] ABSTRACT

A portable word processor incorporates a keyboard for typing-in data relating to a textual document, a microprocessor for processing the data, and a microcassette recorder for storing each page of the textual data when typing of the page is complete. A half-line character display is situated on an operating panel of the word processor above the keyboard. The microprocessor includes a text buffer memory having a capacity corresponding to one page, favorably 1800 characters or 66 lines. A cassette recorder interface is included to control operation of the cassette during transfer of textual data from the text buffer memory for storage on the microcassette tape, and transfer of the data to the text buffer memory from the tape for editing and revision of the textual document. In order to facilitate use of the word processor with a dictating machine on which dictation is recorded to be transcribed on the word processor, a dictating machine interface is also included in the word processor. Control signals for controlling the dictating machine are sent over a multi-wire cable, and the operator can quickly set the dictating machine into a desired stop, forward, rewind, or fast-forward mode while typing dictation merely by actuating certain of the keys on the keyboard of the word processor.

7 Claims, 2 Drawing Figures

WORD PROCESSOR FOR CONTROLLING AN EXTERNAL DICTATING MACHINE

BACKGROUND OF THE INVENTION

1. Field of the Invention

This invention relates to word processing apparatus, and is particularly directed to a portable word processor which can be electrically coupled to a dictating machine to control the same while transcribing dictation recorded thereon.

2. Description of the Prior Art

Conventional word processors normally include a typewriter keyboard, a microprocessor-based data processing circuit, a CRT or other display device for visually presenting all or part of a page of text, and a magnetic disk drive for recording on a magnetic disk the data corresponding to the text typed on the keyboard. A previously typed document can be easily edited or revised using such a word processor. A previously typed segment of the document can be recalled from storage on the magnetic disk, and the text can be suitably altered or the format thereof changed by typing predetermined commands on the keyboard. The portions of the text being so altered are displayed on the display device so that the operator can carry out any textual editing or revision while watching the display device.

After the editing or revision is complete, the final text can be stored on the magnetic disk, or can be transferred to magnetic tape, printed on a desired stock of paper by an electric printer, or transferred over a communication medium to a distant location.

Quite often, the word processor is used to transcribe dictation which has been orally recorded. While it is sometimes possible to use a cassette recorder incorporated into the word processor to play back dictation, it often occurs that the dictation is recorded on a cassette, open reel tape, or belt that is incompatible with the recorder, if any, incorporated in the word processor. In such case, the typist is required to operate the word processor and a separate dictating machine simultaneously. Most often, a foot pedal is used for controlling the dictating machine. However, because foot action is generally rather slow as compared with the action of the fingers, control of the dictating machine tends to be somewhat slower than the speed of operation of the word processor. Thus, using a conventional arrangement, the typist's speed of transcription is restricted because of the requirement to use a pedal to control the dictating machine.

Typing speed and efficiency could thus be improved if there were provided some means to control the mode of a dictating machine by finger action on the keyboard of the word processor.

OBJECTS AND SUMMARY OF THE INVENTION

Accordingly, it is a chief object of this invention to provide a novel word processor device suitable for efficient transcription of oral dictation.

It is a more specific object of this invention to provide a word processor device which can control an external dictating machine.

It is another object of this invention to provide a word processor which furnishes dictating machine command signals in response to manual actuation of certain keys on the word processor keyboard.

It is a more particular object of this invention to provide a word processor device which can control an external dictating machine by finger action so that an emanuensis can transcribe dictation recorded on the dictating machine without any sacrifice of typing speed.

According to an aspect of this invention, a word processor device is provided on which a textual document can be prepared and edited, and which can be used in connection with an external dictating machine for transcribing textual subject matter, such as a letter, a memo, a salesmen's call report, or the like. The dictating machine has a plurality of operating modes which can be selected by means of a device (conventionally, a foot pedal) coupled by a multi-wire cable to the dictating machine. The word processor of this invention comprises a keyboard for entering textual data, signal processing circuitry for receiving the textual data from the keyboard and including a text buffer memory for temporarily storing such data, and a character display module for displaying at least a portion of the textual data stored in the text buffer memory. The keyboard has a plurality of character keys, including letter keys, figure keys, and a space bar, and also includes a code key. Several of the character keys have a command function associated therewith initiated by depressing the code key and the particular character key. A dictating machine interface is coupled to the signal processing circuitry and is also coupled, by a multi-wire cable, to the dictating machine. This interface sends command signals to the dictating machine when certain keys are depressed to change the mode of the dictating machine. For example, a typist can press the code key and the H key to establish the normal forward (play) mode of the dictating machine, and can depress the code key and the space bar to establish the stop mode thereof.

The above and other objects, features, and advantages of this invention will become apparent from the ensuing detailed description of a preferred embodiment, which should be considered in connection with the accompanying drawings.

DETAILED DESCRIPTION OF A PREFERRED EMBODIMENT

Figure 1:
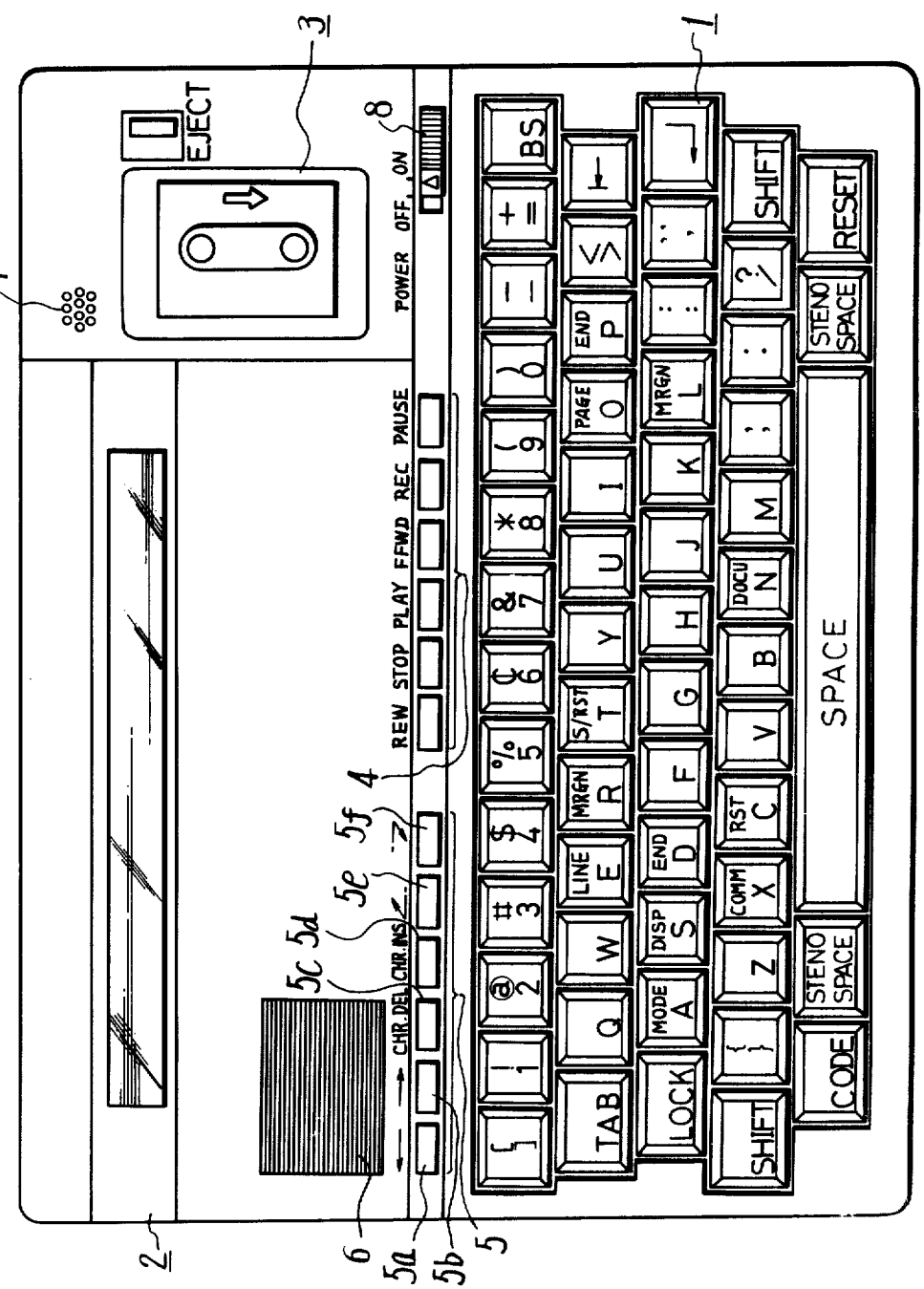
FIG. 1 is a plan view of an operation panel of a word processor device according to an embodiment of this invention.

With reference to the attached drawings, FIG. 1 shows an operations panel of a word processor device embodying this invention. The details of this embodiment are disclosed in detail in the copending patent application Ser. No. 06/328,836 having a common assignee herewith, and which is incorporated herein by reference. While the details thereof need not all be repeated here, the purpose of explaining the present invention is well served by the following brief discussion.

The operation panel has a keyboard 1 thereon generally arranged in a standard, or so-called "QWERTY" configuration, including an array of character keys for typing letters, numbers, and punctuation, and also including the usual carriage return, tab, and backspace keys. Also included are a space bar situated at the lower center of the keyboard 1 with steno space keys to the left and right thereof. A code key and a reset key are respectively included to the left and to the right of the steno space keys.

The steno space keys are used to carry out a steno function and are intended to reduce both the number of keystrokes and operator stroke time, and thereby to improve operator accuracy and efficiency. The steno function can also be used to generate suffixes to follow word stems.

As shown in FIG. 1, several of the keys on the keyboard 1 are marked with a code function word as well as a particular character symbol. The code key is used together with a selected one of the keys to generate an associated function command code. For example, a page-end command code is generated by depressing the code key and then depressing the P key. The reset key serves to deactivate any coded function and to return the keyboard 1 to its typing function. These coded functions can also be used to control an external device, as is discussed in more detail later.

A keyboard character display 2 is disposed above the keyboard 1 and shows a half line of text, i.e., 40 characters, each of which is a 5×10 dot matrix.

A built-in microcassette recorder 3 is included at the upper right-hand portion of the operation panel. A microcassette recorder control panel 4 includes keys REW, STOP, PLAY, FFWD, REC, and PAUSE to initiate rewind, stop, play, fast-forward, record, and pause functions, respectively. These control keys are used during audio recording and playback, and their functions are well known. None of these keys, except the STOP key, are actuable when textual data is transferred to or from a tape in the microcassette recorder 3. The PLAY key is used to play back recorded voice dictation or other audio recording, and to initiate transfer of textual data from the tape in the microcassette recorder 3.

A display control panel 5 is positioned to the left of the microcassette control panel 4, and includes a cursor-left key 5a, a cursor-right key 5b, a character-delete key 5c, a character-insert key 5d, an above-line scroll key 5e, and a below-line scroll key 5f. These keys 5a through 5f are used to control the presentation displayed on the character display 2, and are especially useful in an editing operation.

During a typing operation and during any editing, a cursor is displayed on the LCD character display 2 at the position at which the next character to be typed on the keyboard 1 will appear. Preferably, the cursor takes the form of a bar positioned below the character position.

During an editing operation, the cursor-left key 5a and the cursor-right key 5b are used to move the cursor left and right to a desired editing position, for example to insert or delete a character.

The character-delete key 5c is pressed to delete a character at the cursor position and to close up the resulting space. The character-insert key 5d is actuated to insert a character or a space at the cursor position, or to adjust the spacing between words.

The above-line scroll key 5e is depressed to display the first 40 characters of a particular line, or to display the last 40 characters of a previous line. Similarly, the below-line scroll key 5f is depressed to display the last 40 characters of a particular line, or to display the first 40 characters of the next successive line.

A built-in loudspeaker 6 and a built-in condenser microphone 7 are included on the operation panel. The microphone 7 is used for recording dictation or audio information, and the loudspeaker 6 is used for listening to the same when played back.

An on-off switch 8 is also included on the operation panel.

The general arrangement of the electronic control circuitry for the above-described word processor will be explained with reference to FIG. 2. Elements previously described with reference to FIG. 1 are identified in FIG. 2 by the same reference numerals, and a detailed description thereof will not be repeated.

Figure 2:
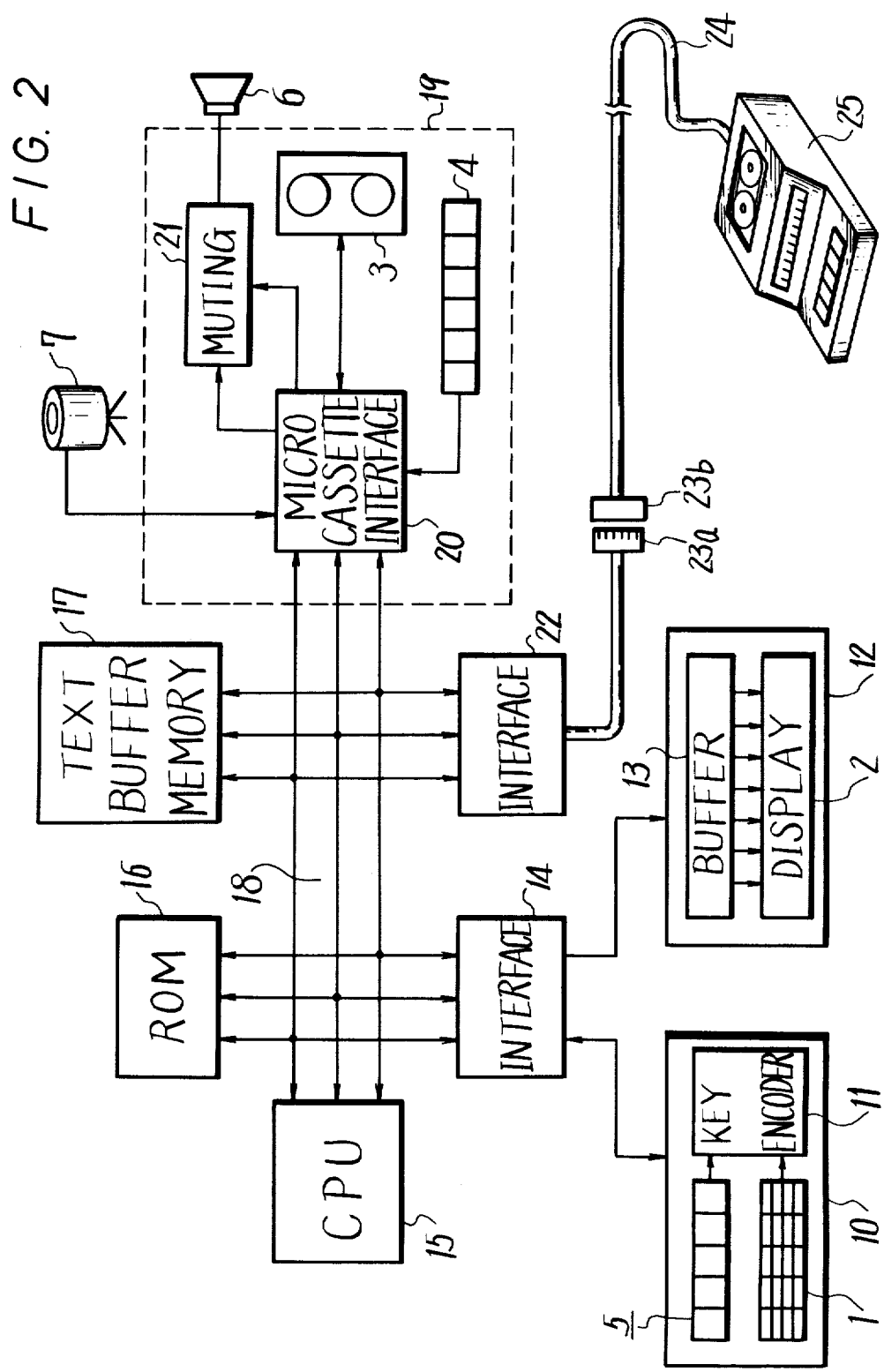
FIG. 2 is a schematic circuit diagram of the word processing device of FIG. 1, showing a connection thereof to an associated dictating machine.

As shown in FIG. 2, a keyboard module 10 includes a keyboard encoder 11 coupled to the keyboard 1 and to the display control keys 5. Also, a display module 12 includes a display character buffer/driver 13 for driving the liquid crystal display 2.

A microprocessor is used to control operation of the word processor, and includes an interface 14 coupled to the keyboard encoder 11 and to the display character buffer/driver 13, a central processing unit or CPU 15, a read-only memory or ROM 16 on which a control program for controlling the word processor is permanently stored, a text buffer memory 17 having a capacity sufficient for storing up to one full page of textual data, and a data bus 18 connecting the interface 14, the CPU 15, the ROM 16, and the text buffer memory 17.

A microcassette control board 19, shown generally by a dash line enclosure, has a recorder interface 20 coupled to the recorder 3, the control keys 4, and the microphone 7, and also coupled to the data bus 18. A muting circuit 21 is also included between the interface 20 and the speaker 6 to prevent data tones from being reproduced on the speaker 6 when textual information is transfered from the cassette recorder 3 to the text buffer memory 17.

Although not shown, the interface 20 includes a frequency shift keyer to convert data to a stream of marks and spaces represented, for example, by audio tones with a frequency of 600 Hz and 300 Hz, respectively. This frequency shift keyer is also operative to convert such tones picked up from the tape in the microcassette recorder 3 back into binary data.

As mentioned above, the text buffer memory 17 has a capacity to store up to one full page of textual data. Preferably, this corresponds to up to 1800 eight-bit bytes for storing up to a maximum of 1800 typed characters or 66 lines. This memory size corresponds approximately to one page of text on standard (i.e., letter-sized) paper. The text buffer memory 17 serves to store data corresponding to a particular page of a textual document temporarily unit such data can be transferred to the microcassette 31. Of course, the text buffer memory 17 also serves to store a particular page of textual data called up from the microcassette recorder 3 so that the page of textual data can be edited or revised as required.

In the word processor as described above, a stream of characters is typed on the keyboard 1, and the encoded characters are furnished from the keyboard encoder 11 through the interface 14 to be stored in the text buffer memory 17. As previously mentioned, the memory 17 has a capacity corresponding to a single typed page, and in this embodiment, the capacity is 1800 characters.

When the operator has finished typing a particular page, the textual data stored in the memory 17 can be transfered to a microcassette tape in a recorder 3. This is carried out by typing a command on the keyboard 1. When this is done, a corresponding command signal is furnished to the CPU 15, and in response, the CPU 15 executes transfer of the textual data stored in the memory 17, in sequence, to the recorder interface 20. Then, the textual data is recorded, as a sequence of 300 Hz and 600 Hz spaces and marks, onto magnetic tape. In order to facilitate identification of each page of data recorded on the tape, a header code is recorded immediately before the textual data is read out from the memory 17. This header code includes synchronizing signals, block number code, and other codes associated with the textual data to be recorded.

By use of the function keys 4, the typist or operator can also record audio signals on tape. The audio signals can be recorded voice messages to identify a particular document to which textual data relates, and can be recorded interspersed with the pages of recorded textual data.

In order to carry out the principles of this invention, the word processor further comprises a remote-device-control interface 22 for furnishing command signals to an external device, such as a dictating machine used for transcription. The interface 22 is connected by means of the data bus 18 to the CPU 15 of the microprocessor and has a male connector 23a, to which a female connector 23b of a multi-wire control cable 24 is connected. The cable 24 then connects the interface 22 to a dictating machine 25. Although not shown in the drawing, the dictating machine 25 has a coupling connector to which a mating connector (not shown) on the cable 24 is connected. A control device, such as a foot pedal control, is normally plugged into the coupling connector on the dictating machine 25, and the cable 24 is wired to provide the control signals that are usually provided by the foot pedal control.

According to one embodiment, the keys PAUSE, REC, FFWD, PLAY, STOP, and REW of the panel 4 can be actuated to initiate generation of corresponding pause, record, fast-forward, normal forward, stop and rewind control signals for establishing associated modes of the dictating machine 25. In such case, when the male and female connectors 23a and 23b are joined, the interface 22 communicates with the recorder interface 20, so that the respective mode commands are given to the dictating machine 25 instead of to the recorder 3.

According to another embodiment, keys of the keyboard 1 are used to initiate the generation of mode command signals by the interface 22. In fact, it has been determined that transcription efficiency can be enhanced remarkably by using centrally-positioned keys on the keyboard 1 to control the mode of the dictating machine 25. In one favorable example, the fast rewind, fast forward, play-back, and stop functions are required for the dictating machine, and the respective modes can be established by depressing the code key and then depressing the F key, G key, H key, and space bar. Of course other possible combinations of keys could also be used.

As is apparent, the word processor according to this invention as described above facilitates transcription from recorded dictation being played back by means of a dictating machine. In particular, the use of keys of the word processor on the panel 4 or the keyboard 1 permits rapid control, using typing movements, of the mode of the associated dictating machine 25.

Although various brands and models of dictating machines have different sizes and styles of connectors or sockets to which a foot pedal control cable or other control device can be connected, it is possible to furnish an adapter for any particular dictating machine so that the same can be made to operate in conjunction with the word processor of this invention.

While preferred embodiments of this invention have been described in detail hereinabove, many modifications and variations would be apparent to those skilled in the art without departing from the scope or spirit of the present invention, which is to be defined by the appended claims.

We claim:

1. A word processor device for preparing and editing a textual document and for use in connection with an external dictating machine for transcribing textual subject matter orally recorded on the dictating machine, the latter having a plurality of operating modes which can be selected by means of a device external thereto coupled by a multi-wire cable to the dictating machine, the word processor device comprising:

keyboard means for entering textual data and having a plurality of keys associated with typing characters, with at least some of said keys being selectively actuable to enter respective dictating machine operating mode commands to control the operation of said dictating machine in said modes;

processor means connected to said keyboard means for receiving the textual data and commands entered on said keyboard means, and having a text buffer memory means for temporarily storing said textual data;

character display means connected to said processor means for displaying at least a portion of the textual data stored in said text buffer memory means;

dictating machine interface means connected to said processor means; and a multi-wire cable for connecting said interface means to the dictating machine to supply mode command signals to the dictating machine in response to the respective operating mode commands entered on said keyboard means.

2. A word processor device according to claim 1, wherein said keyboard means includes a code key and a plurality of character keys, and said dictating machine operating commands are each entered by depressing both said code key and a selected one of said character keys.

3. A word processor device according to claim 2, wherein the plurality of said modes of said dictating machine include a stop mode, a rewind mode, a forward mode, and a fast forward mode; said character keys are arranged in a standard QWERTY configuration with an F key, a G key, and an H key disposed in order centrally on the keyboard means and a space key arranged as a bar below the other character keys; said fast-forward, said rewind, and said forward modes are each selected by depressing said code key and a particular one of said F key, said G key, and said H key; and said stop mode is selected by depressing said code key and said space key.

4. A word processor device according to claim 1, wherein said processor means includes a micro-processor having a central processing unit for controlling operation of said word processor device, a first memory containing a program routine for exercising control of said word processor device, a keyboard interface means for receiving data entered on said keyboard means and supplying said textual data from said text buffer memory means to said character display means; and data bus means providing a transmission path among said central processing unit, said first memory, said text buffer memory means, said keyboard interface means, and said dictating machine interface means.

5. A word processor device according to claim 4, further comprising a multi-wire cable connector coupled to said dictating machine interface means to cooperate with a corresponding multi-wire cable connector on said cable.

6. A word processor device according to claim 4, further comprising cassette recorder means integrally included in said device, including a cassette recorder for recording information on a magnetic tape and playing the same back, and recorder interface means coupled to said data bus means for transferring the textual data stored in said text buffer memory means to said recorder and for transferring textual data played back from said tape to said text buffer memory in response to commands entered on said keyboard means.

7. A word processor device according to claim 6, wherein said keyboard means includes mode selection keys for ordinarily selecting respective modes of said cassette recorder, and wherein said dictating machine interface means is operative, when said dictating machine is coupled thereto, to furnish commands associated with said mode selection keys to said dictating machine for controlling the operating modes of said dictating machine rather than applying said commands to said cassette recorder.

* * * * *